(12) United States Patent
Oh et al.

(10) Patent No.: US 7,935,580 B2
(45) Date of Patent: May 3, 2011

(54) DISPLAY SUBSTRATE, METHOD OF MANUFACTURING THE SAME AND DISPLAY DEVICE HAVING THE SAME

(75) Inventors: Min-Seok Oh, Yongin-si (KR); Shi-Yul Kim, Yongin-si (KR); Sang-Gab Kim, Seoul (KR); Joo-Han Kim, Yongin-si (KR); Hong-Kee Chin, Suwon-si (KR); Yu-Gwang Jeong, Yongin-si (KR); Seung-Ha Choi, Shiheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 11/864,165

(22) Filed: Sep. 28, 2007

(65) Prior Publication Data

US 2008/0079002 A1    Apr. 3, 2008

(30) Foreign Application Priority Data

Sep. 29, 2006   (KR) ........................ 10-2006-0095260

(51) Int. Cl.
   *H01L 21/00*       (2006.01)
(52) U.S. Cl. ................... 438/149; 257/72; 257/E29.151

(58) Field of Classification Search ................... 438/30, 438/149; 257/59, 72, E29.147, E29.151; 349/43

See application file for complete search history.

(56) References Cited

U.S. PATENT DOCUMENTS

| 6,873,382 B2 * | 3/2005 | Chang et al. ................... 349/106 |
| 7,250,316 B2 * | 7/2007 | Soh ................................. 438/30 |
| 7,315,344 B2 * | 1/2008 | Lim ............................... 349/187 |

* cited by examiner

*Primary Examiner* — David Vu
(74) *Attorney, Agent, or Firm* — H.C. Park & Associates, PLC

(57) ABSTRACT

A display substrate includes a gate line, a storage capacitor, a source line, a switching element, a pixel electrode, and a color filter. The gate line is formed on a base substrate. The storage capacitor has a storage line substantially parallel to the gate line. The source line crosses the gate line to define a pixel area. The switching element is connected to the gate line and the source line. The pixel electrode contacts the switching element. The color filter pattern is formed between the base substrate and the pixel electrode such that the color filter pattern contracts the base substrate and the pixel electrode. Thus, the color filter pattern is formed on the display substrate using a three-mask process.

8 Claims, 15 Drawing Sheets

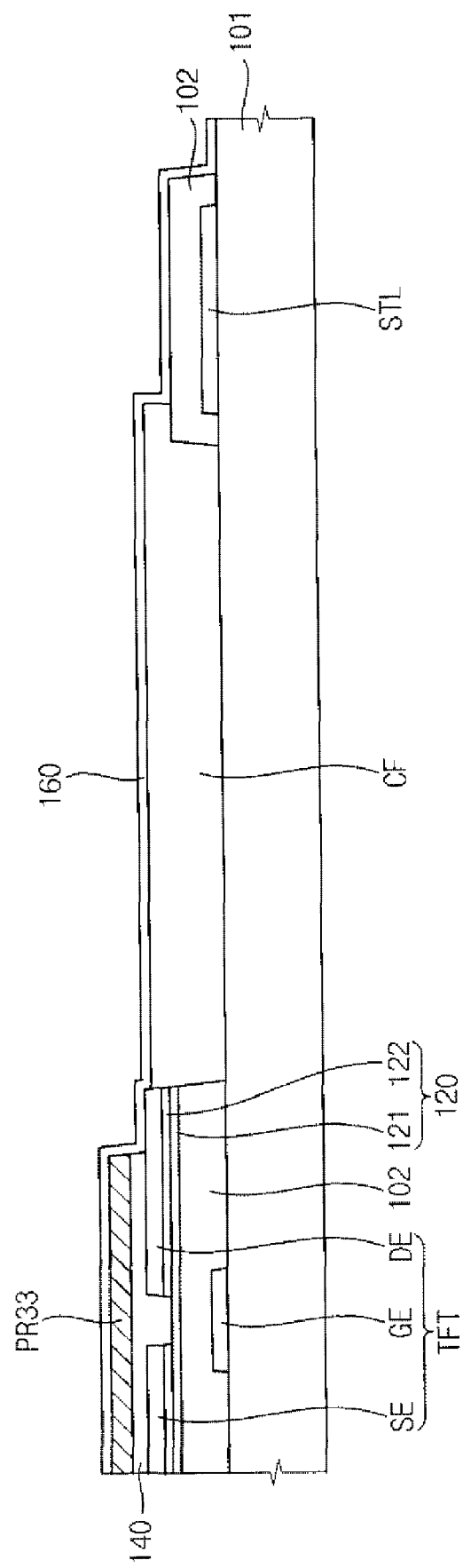

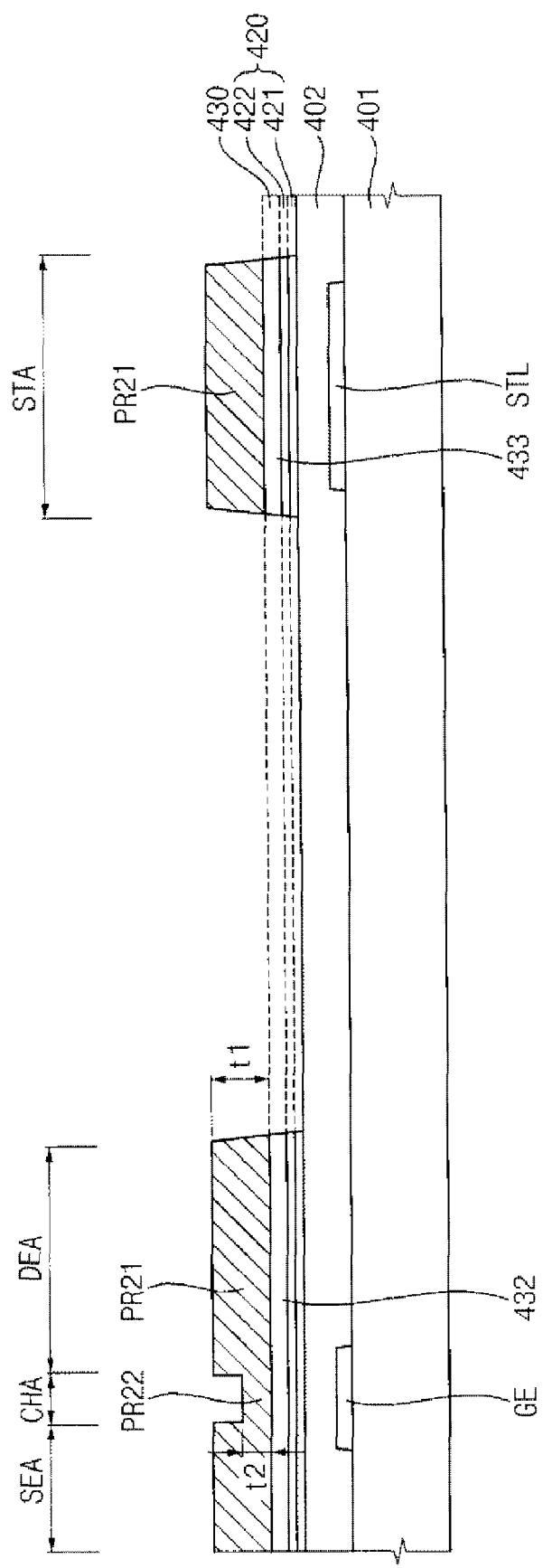

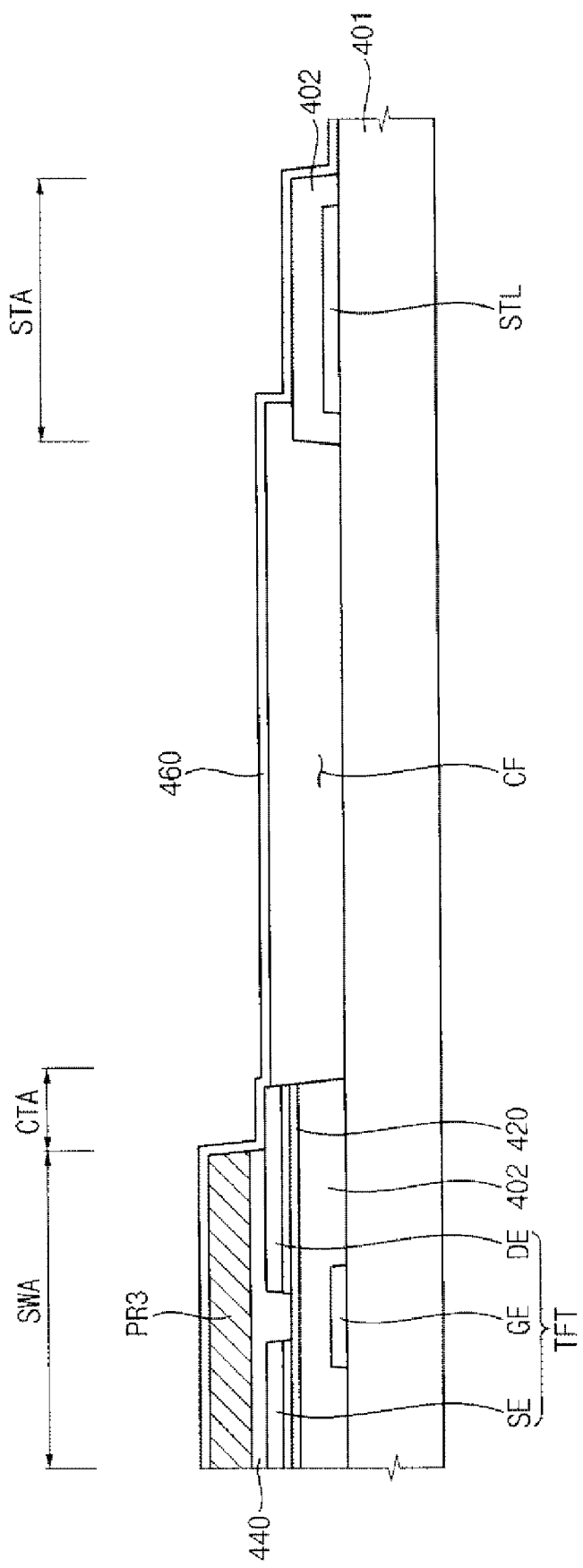

DISPLAY SUBSTRATE, METHOD OF MANUFACTURING THE SAME AND DISPLAY DEVICE HAVING THE SAME

CROSS-REFERENCE TO RELATED APPLICATIONS

This application claims priority from and the benefit of Korean Patent Application No. 10-2006-0095260, filed on Sep. 29, 2006, which is hereby incorporated by reference for all purposes as if fully set forth herein.

BACKGROUND OF THE INVENTION

1. Field of the Invention

The present invention relates to a display substrate, a method of manufacturing the display substrate, and a display device including the display substrate. More particularly, the present invention relates to a display substrate that may be produced by a simplified manufacturing process and may have enhanced reliability, the method of manufacturing the display substrate, and a display device including the display substrate.

2. Discussion of the Background

Generally, a liquid crystal display (LCD) device includes a display substrate, an opposite substrate, and a liquid crystal layer interposed between the display substrate and the opposite substrate. A plurality of gate lines and a plurality of source lines crossing the gate lines are formed on the display substrate. In addition, a thin-film transistor (TFT) connected to a gate line and a source line, and a pixel electrode connected to the TFT are formed on the display substrate. The TFT includes a gate electrode, a channel, a source electrode, and a drain electrode. The gate electrode extends from a gate line. The channel is insulated from the gate electrode and overlaps the gate electrode. The source electrode extends from the source line and is connected to the channel. The drain electrode is spaced apart from the source electrode and connected to the channel.

In order to manufacture a display substrate, a mask is required. In order to reduce the time and costs associated with manufacturing, a significant amount of effort has been made to simplify masking processes.

For example, a five-masking process is a manufacturing process in which five masks are applied, one in each of a gate metal patterning process, a channel patterning process, a source metal patterning process, a passivation layer patterning process, and a pixel electrode patterning process. Alternatively, a four-masking process is a manufacturing process in which a channel patterning process and a source metal patterning process are performed using only one mask. Recently, a three-masking process has been developed in which a passivation patterning process and a pixel electrode pattern process are also performed using only one mask.

SUMMARY OF THE INVENTION

The present invention provides a display substrate that may be produced by a simplified manufacturing process and may have enhanced reliability.

The present invention also provides the method of manufacturing the display substrate.

The present invention also provides a display device having the display substrate.

Additional features of the invention will be set forth in the description which follows, and in part will be apparent from the description, or may be learned by practice of the invention.

The present invention discloses a display substrate including a gate line, a storage capacitor, a source line, a switching element, a pixel electrode, and a color filter pattern. The gate line is disposed on a base substrate. The storage capacitor includes a storage line substantially parallel to the gate line. The source line crosses the gate line to define a pixel area. The switching element is connected to the gate line and the source line. The pixel electrode contacts the switching element. The color filter pattern is disposed between the base substrate and the pixel electrode such that the color filter pattern contacts the base substrate and the pixel electrode.

The present invention also discloses a method of manufacturing a display substrate including forming a gate pattern on a base substrate using a first photo-resist pattern. A gate insulation layer, a channel layer, and a source metal layer are formed on the base substrate having the gate pattern formed thereon. A source metal layer is patterned using a second photo-resist pattern to form a source pattern. A protection layer is formed on the base substrate having the source pattern formed thereon. The protective insulation layer and the gate insulation layer are patterned using a third photo-resist pattern to expose a portion of the base substrate. A color filter pattern is formed on the exposed portion. A pixel electrode is formed on the base substrate having the color filter formed thereon.

The present invention also discloses a display device including a display substrate, an opposite substrate, and a liquid crystal layer. The display substrate includes a switching element, a pixel electrode, and a color filter pattern. The switching element is connected to a gate line and a source line that are formed on a first base substrate. The pixel electrode is connected to the switching element. The color filter pattern is formed between the base substrate and the pixel electrode such that the color filter contacts the base substrate and the pixel electrode. The opposite substrate includes a light-blocking pattern and a common electrode. The light-blocking pattern is formed on a second base substrate facing the first base substrate, which corresponds to the gate and source lines. The common electrode is formed on the second substrate having the light-blocking pattern formed thereon. The liquid crystal layer is interposed between the display substrate and the opposite substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3A, FIG. 3B, FIG. 3C, FIG. 3D, FIG. 3E, FIG. 3F, FIG. 3G, and FIG. 3H are cross-sectional views showing a method for manufacturing a display substrate according to an exemplary embodiment of the present invention.

FIG. 4A, FIG. 4B, FIG. 4C, FIG. 4D, and FIG. 4E are cross-sectional views showing a method for manufacturing a display substrate according to another exemplary embodiment of the present invention.

DETAILED DESCRIPTION OF THE ILLUSTRATED EMBODIMENTS

Figure 1:
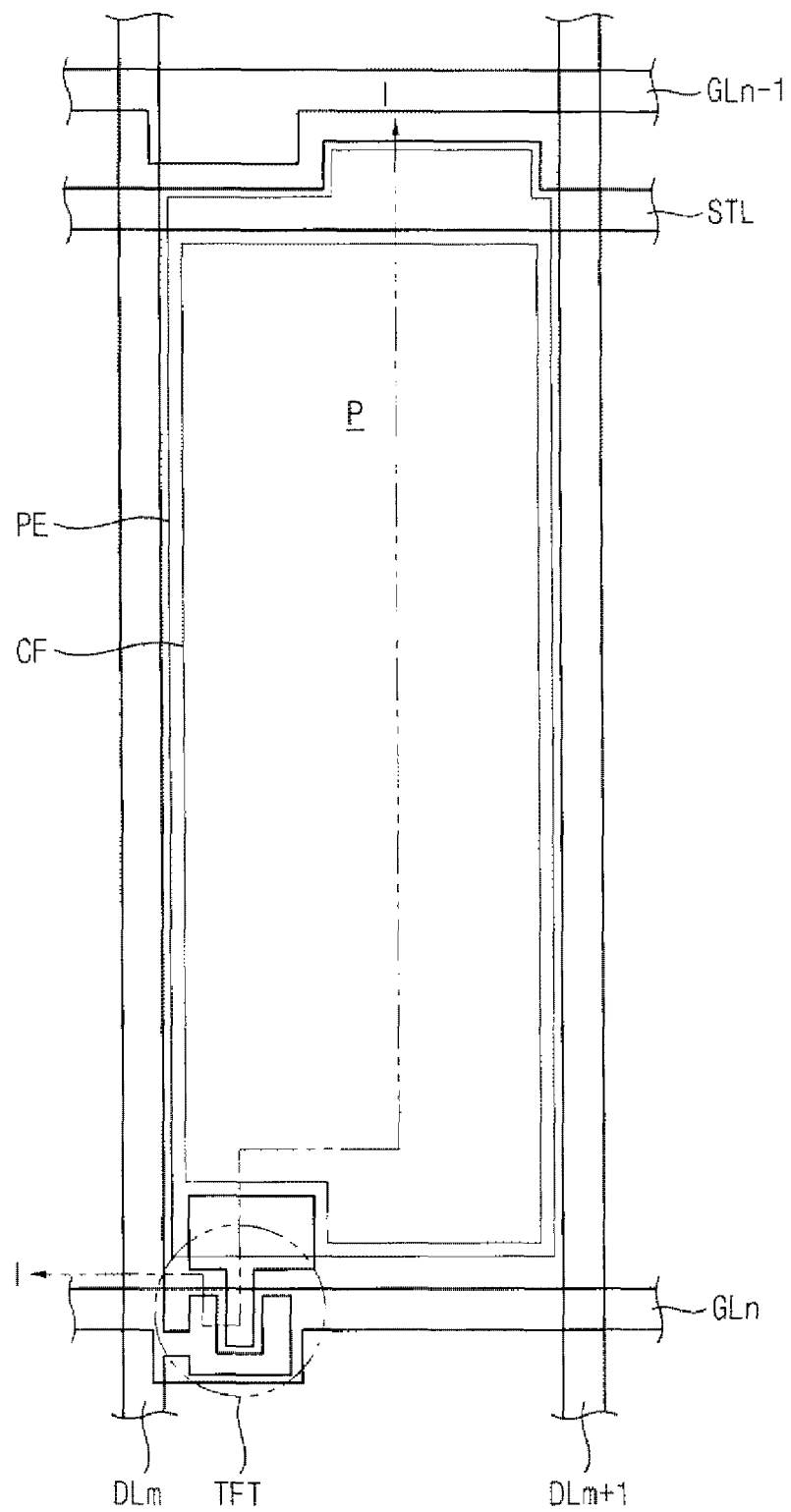
FIG. 1 is a plan view showing a display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
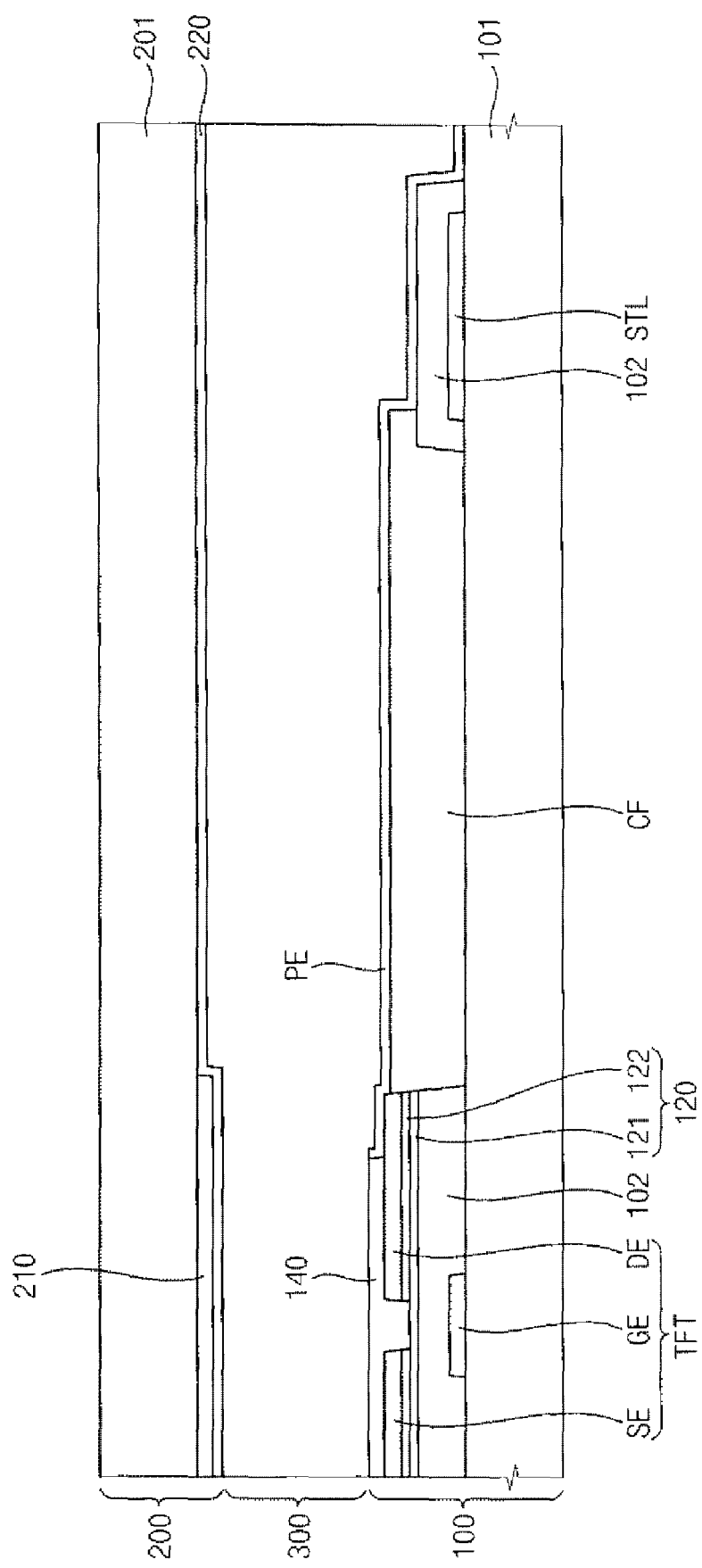
FIG. 2 is a cross-sectional view taken along line I-I' in FIG. 1.

FIG. 1 is a plan view showing a display device according to an exemplary embodiment of the present invention. FIG. 2 is a cross-sectional view taken along line I-I' in FIG. 1.

Referring to FIG. 1 and FIG. 2, a display device includes a display substrate 100, an opposite substrate 200 that faces the display substrate 100, and a liquid crystal layer 300 interposed between the display substrate 100 and the opposite substrate 200.

The display substrate 100 includes a first base substrate 101. The first base substrate 101 includes a plurality of gate lines GLn−1 and GLn, a plurality of source lines DLm and DLm+1, a pixel part P, a switching element TFT, a storage common line STL, a color filter pattern CF, and a pixel electrode PE.

The gate lines GLn−1 and GLn extend along a first direction, and the source lines DLm and DLm+1 extend along a second direction crossing the first direction.

The pixel part P is formed in an area that is defined by the gate lines GLn−1 and GLn and the source lines DLm and DLm+1. The pixel part P includes the switching element TFT, the storage common line STL, the color filter pattern CF, and the pixel electrode PE.

The switching element TFT includes a gate electrode GE extending from the gate line GLn, a source electrode SE extending from the source line DLm, and a drain electrode DE connected to the pixel electrode PE. A gate insulation layer 102 is formed on the gate electrode GE, and a channel layer 120 is formed on the gate insulation layer 102. The channel layer 120 overlaps the gate electrode GE and is connected to the source and drain electrodes SE and DE. The channel layer 120 includes an activation layer 121 including amorphous silicon (a-Si) and an ohmic contact layer 122 including n+amorphous silicon (n+a-Si) that is heavily doped with an n-type impurity.

The storage common line STL is connected to adjacent pixel parts along the first direction. The storage common line STL applies a common voltage to the adjacent pixel parts. A gate insulation layer 102 is formed on the storage common line STL, and the pixel electrode PE overlaps the storage common line STL and is formed on the gate insulation layer 102. That is, the storage common line STL, the gate insulation layer 102, and the pixel electrode PE form a storage capacitor in the pixel part P.

The color filter pattern CF is formed below the pixel electrode PE.

Particularly, the pixel part P is divided into a first area on which a metal layer is formed, and a second area on which the metal layer is not formed. For example, the first area includes the gate lines GLn−1 and GLn, the source lines DLm and DLm+1, the storage common line STL, and the switching element TFT that are formed thereon, so that the gate insulation layer 102 and the protection layer 140, which insulate the different metal layers from each other, are formed on the first area. On the other hand, the second area may have the pixel electrode PE formed thereon, such that the metal layers are not formed on the second area. Therefore, the gate insulation layer 102 and the protection layer 140 are not formed between the first base substrate 101 and the pixel electrode PE.

A portion of the first base substrate 101 may be exposed between first areas of the pixel part P. The color filter pattern CF is formed on a relatively low area of the first and second areas, i.e., on the second area. That is, the color filter pattern CF is disposed between the first base substrate 101 and the pixel electrode PE, so that the exposed portion may be covered. When the exposed portion is covered, the generation of defects such as light leakages, rubbing errors, etc., that are often caused by empty space between the pixel electrode PE and the first base substrate 101, may be prevented.

The pixel electrode PE includes a transparent conductive layer. The pixel electrode PE may directly contact an end portion of the drain electrode DE and is formed on the color filter pattern CF, as shown in FIG. 1 and FIG. 2.

The opposite substrate 200 includes a second base substrate 201.

A light-blocking pattern 210 is formed on the second base substrate 201. The light-blocking pattern 210 divides the second base substrate 201 into a transmitting area that transmits light and a blocking area that blocks light. For example, the light-blocking pattern 210 corresponds to the gate lines GLn−1 and GLn, the source lines DLm and DLm+1, and the switching element TFT. Although not shown in FIG. 1 and FIG. 2, the light-blocking pattern 210 may correspond to the storage common line STL.

A common electrode 220 facing the pixel electrode PE is formed on the second base substrate 201 having the light-blocking pattern 210 formed thereon.

Therefore, the pixel electrode PE, the liquid crystal layer 300, and the common electrode 220 define a liquid crystal capacitor of the pixel part P.

Example 1

Method of Manufacturing a Display Substrate

FIG. 3A, FIG. 3B, FIG. 3C, FIG. 3D, FIG. 3E, FIG. 3F, FIG. 3G, and FIG. 3H are cross-sectional views showing a method for manufacturing a display substrate according to an exemplary embodiment of the present invention.

Figure 3A:
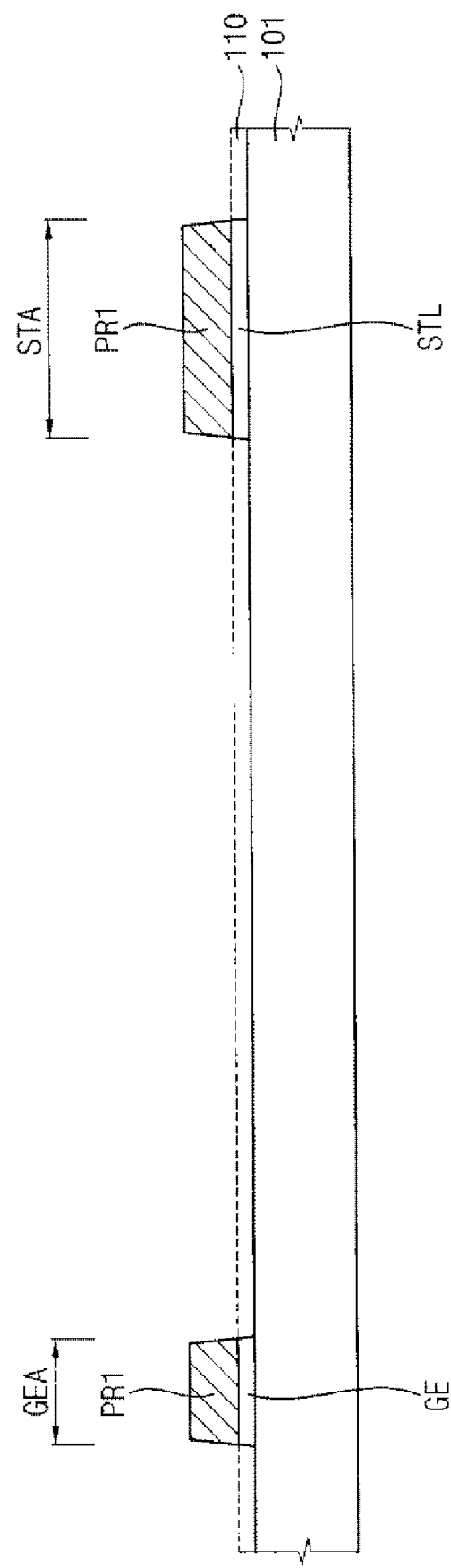

Referring to FIG. 1 and FIG. 3A, the gate metal layer 110 is deposited on the first base substrate 101. A first photo-resist layer is formed on the first gate metal layer 110, and then patterned using a first mask to form a first photo-resist pattern PR1.

The first photo-resist pattern PR1 is formed on a gate line area (not shown), a gate electrode area GEA, and a storage area STA.

The gate metal layer 110 is patterned using the first photo-resist pattern PR1 to form a gate pattern including the gate lines GLn−1 and GLn, the gate electrode GE, and the storage common line STL on the gate line area (not shown), the gate electrode area GEA, and the storage area STA, respectively.

Figure 3B:
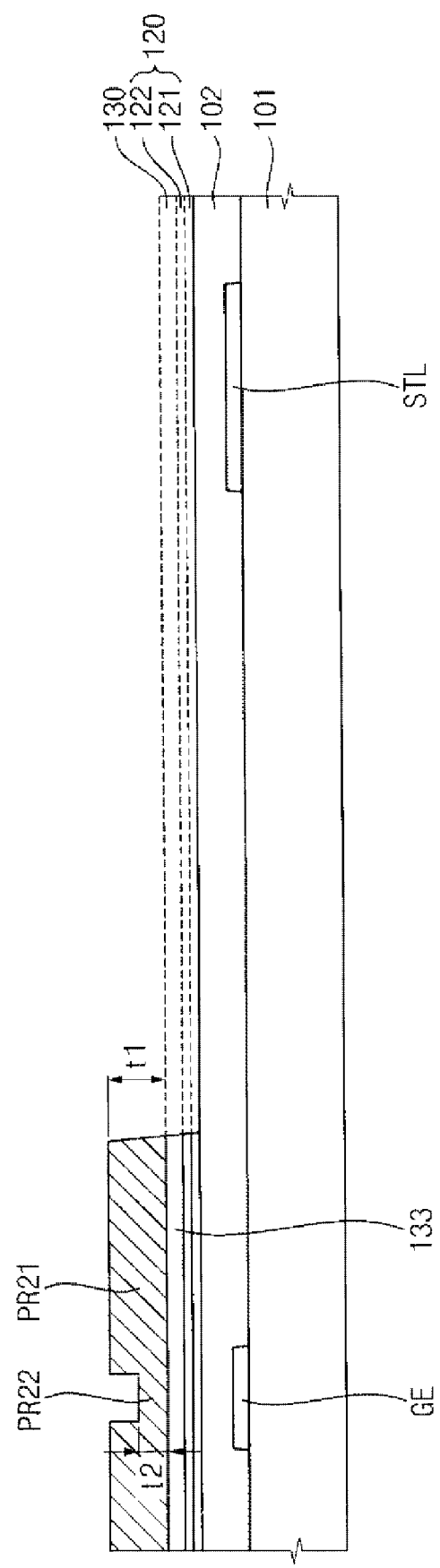

Referring to FIG. 1 and FIG. 3B, the gate insulation layer 102 is formed on the first base substrate 101 having the gate pattern formed thereon.

A channel layer 120 is formed on the first base substrate 101 having the gate insulation layer 102 formed thereon. The channel layer 120 includes an activation layer 121 including amorphous silicon (a-Si) and an ohmic contact layer 122 including n+amorphous silicon (n+a-Si) that is heavily doped with an n-type impurity.

A source metal layer 130 is formed on the first substrate 101 having the channel layer 120 formed thereon.

A second photo-resist layer is formed on the first base substrate 101 having the source metal layer 130 formed thereon, and then patterned using a second mask to form a second photo-resist pattern.

The second photo-resist pattern includes a first portion PR21 having a first thickness t1 and a second portion PR22 having a second thickness t2 that is relatively thinner the first thickness t1.

The first portion PR21 is formed on a source line area (not shown), a source electrode area SEA, and a drain electrode area DEA. The second portion PR22 is formed on a channel area CHA where the source electrode SE and the drain electrode DE will be spaced apart from each other to expose the activation layer 121.

The source metal layer 130 and the channel layer 120 are patterned using the first and second portions PR21 and PR22 to form a source pattern. The source pattern includes a source metal pattern 133 and the source lines DLm and DLm+1. The source metal pattern 133 is formed in the source electrode area SEA, the channel area CHA, and the drain electrode area DEA. The source lines DLm and DLm+1 are formed on the source line area (not shown).

Figure 3C:
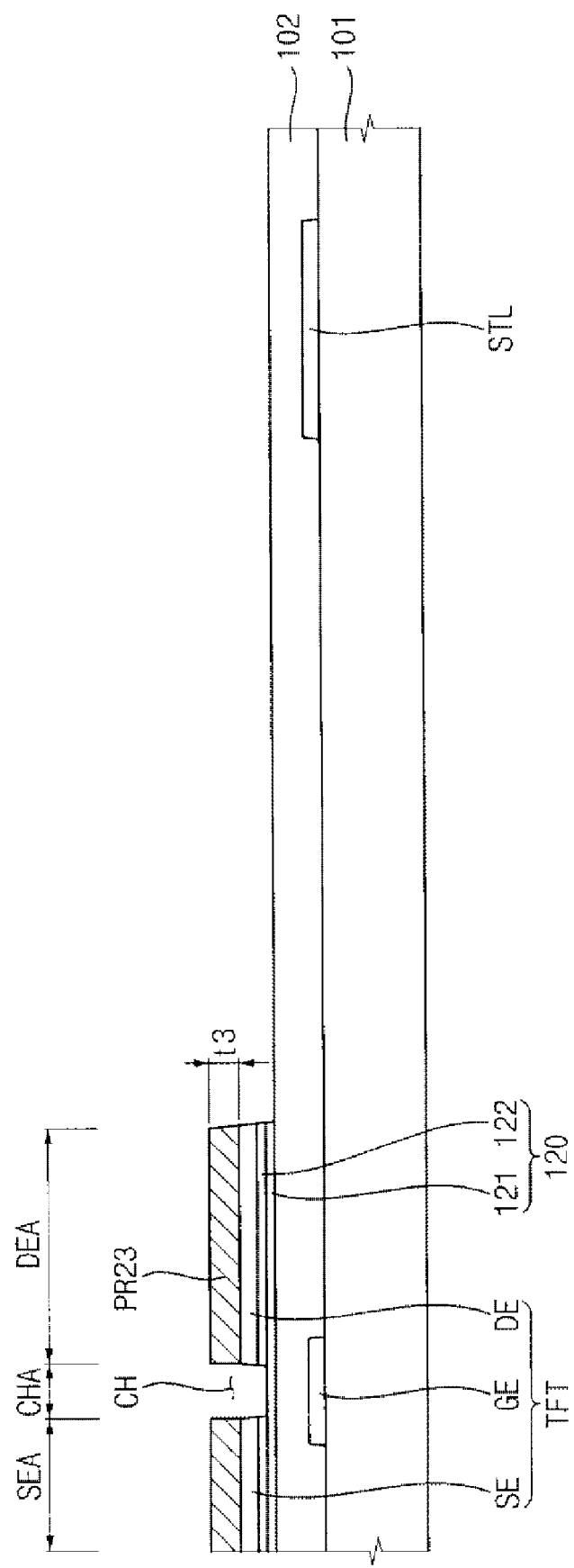

Referring to FIG. 1 and FIG. 3C, a predetermined thickness of the first portion PR21 of the second photo-resist pattern is removed by an etch-back process. Then, the second portion PR22 formed in the channel area CHA is removed by an etch-back process. A first remaining pattern PR23 having a third thickness t3 may remain on the source electrode area SEA and the drain electrode area DEA.

The source metal pattern 133 is patterned using the first remaining pattern PR23 to form the source electrode SE and the drain electrode DE, and then the ohmic contact layer 122 of the channel area CHA is removed to expose the activation layer 121. Therefore, the source electrode SE, the drain electrode DE, and the channel part CH of the switching element TFT may be completed. Then, the first remaining pattern PR23 is removed by a stripping process.

Figure 3D:
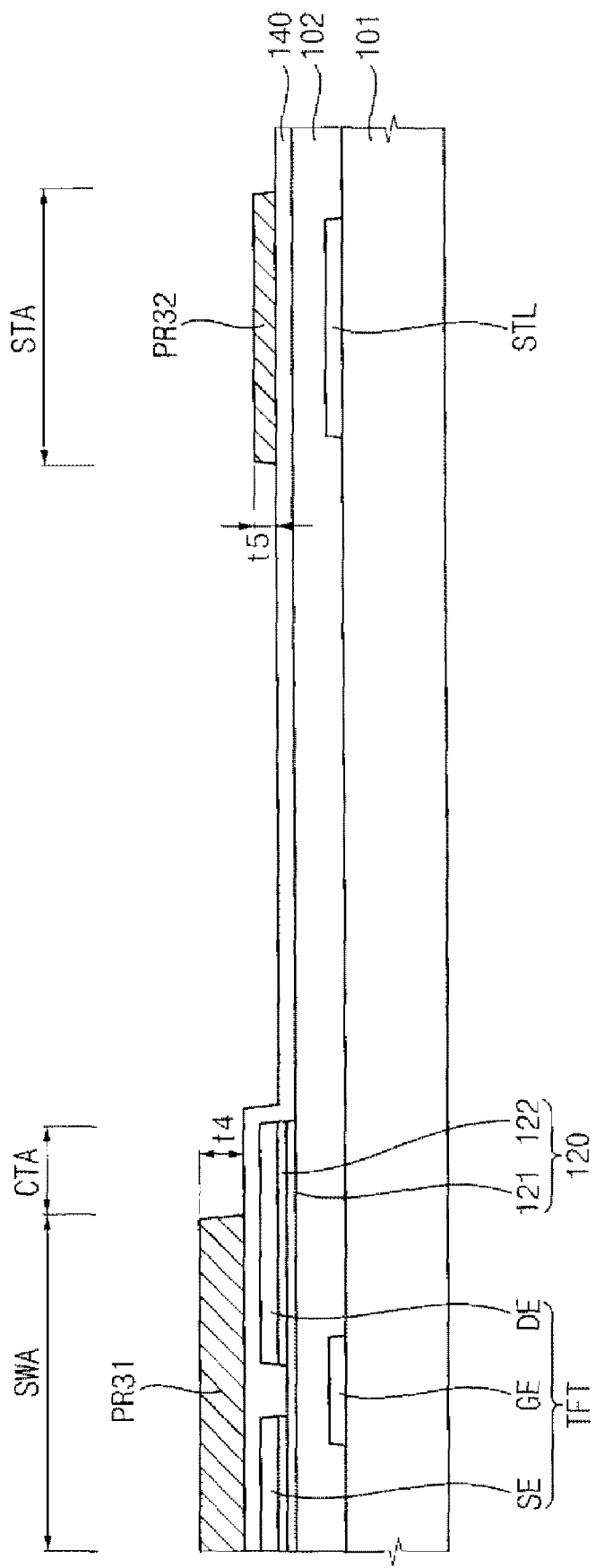

Referring to FIG. 1 and FIG. 3D, a protective insulation layer 140 is formed on the first base substrate 101 having the switching element TFT formed thereon. A third photo-resist layer is formed on the first base substrate 101 having the protective insulation layer 140 formed thereon and then patterned using a third mask to form a third photo-resist pattern.

The third photo-resist pattern is substantially formed on an area where the pixel electrode PE is not formed. For example, the third photo-resist pattern is formed on an area (not shown) having the gate lines GLn−1 and GLn formed thereon and an area SWA having the switching element TFT formed thereon.

Particularly, the third photo-resist pattern includes a third portion PR31 and a fourth portion PR32.

The third portion PR31 having a fourth thickness t4 is formed on an area (not shown) having the gate lines GLn−1 and GLn formed thereon, an area (not shown) having the source lines DLm and DLm+1 formed thereon, and the area SWA having the switching element TFT formed thereon. The third photo-resist pattern is not formed on a contact area CTA where the switching element TFT will contact the pixel electrode PE. The contact area CTA corresponds to an end portion of the drain electrode DE.

The fourth portion PR32 is formed on the storage area STA having a fifth thickness t5 that is relatively thinner than the fourth thickness t4.

Figure 3E:
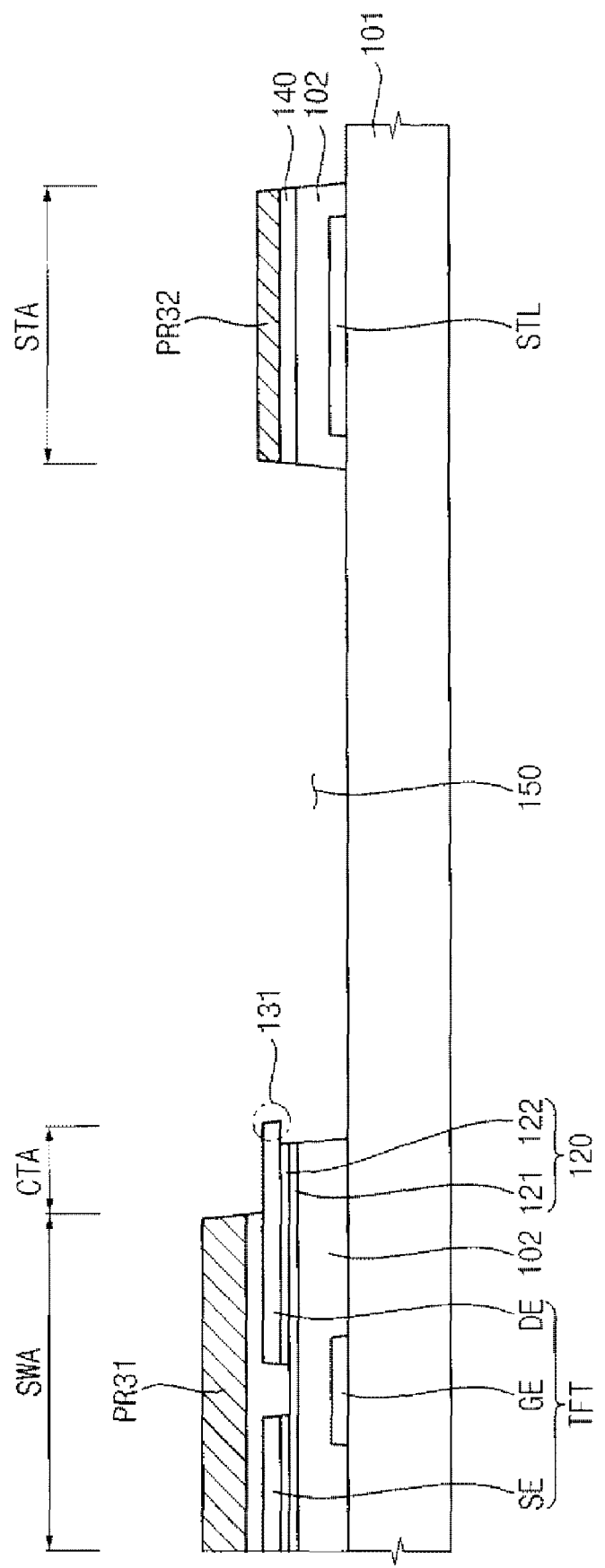

Referring to FIG. 1 and FIG. 3E, the protective insulation layer 140 and the gate insulation layer 102 that are exposed by the third and fourth portions PR31 and PR32 are removed during a first etching process.

A portion 150 of the first base substrate 101 is exposed through the first etching process, and then an end portion of the drain electrode DE is over-etched, thereby forming an extrusion part 131, i.e., a tip.

Figure 3F:
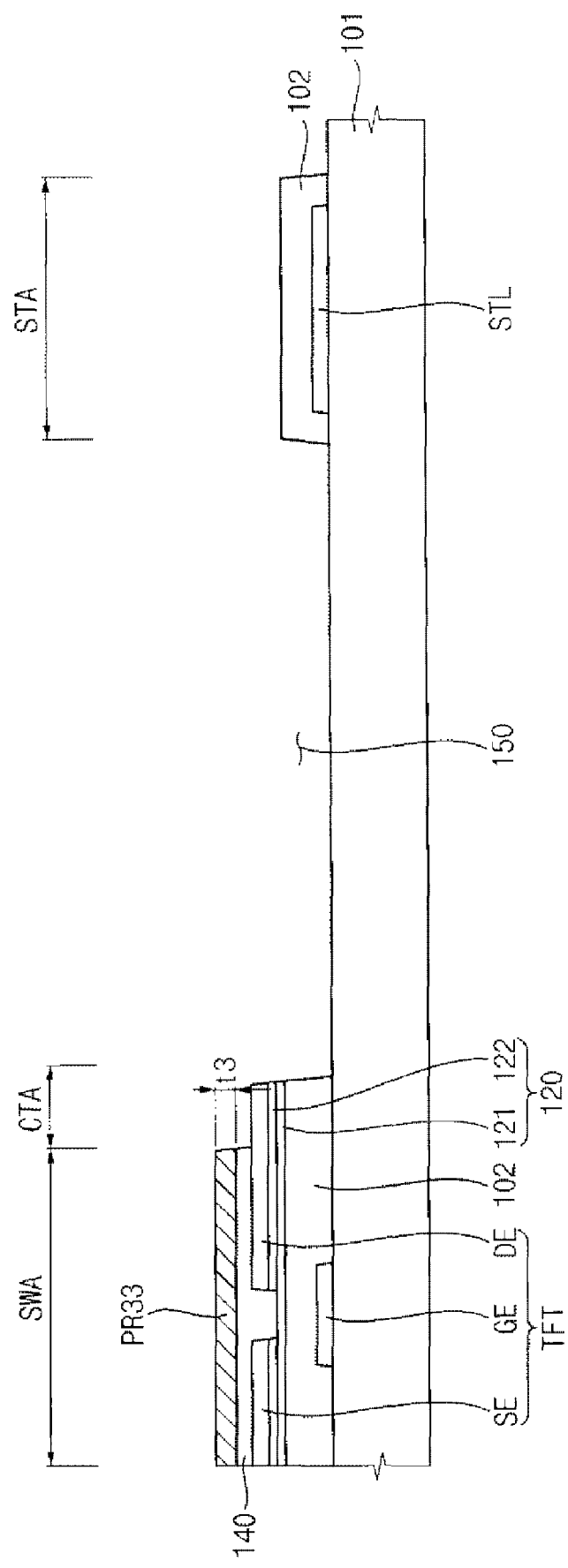

Referring to FIG. 1 and FIG. 3F, a predetermined thickness of the first portion PR31 of the third photo-resist pattern is removed by an etch-back process. Accordingly, the fourth portion PR32 formed in the storage area STA is removed by an etch-back process. A second remaining pattern PR33 may remain on the switching element SWA.

The extrusion part 131 is removed using the second remaining pattern PR33 during a second etching process, and then a protective insulation layer 140 formed on the storage area STA is removed.

As a result, the first base substrate 101 may be divided into a first area on which the gate and source metal layers are formed and a second area on which the gate and source metal layers are not formed through the first and second etching processes, respectively.

The first area includes an area on which the gate lines GLn−1 and GLn are formed, an area on which the source lines DLm and DLm+1 are formed, an area SWA on which the switching element TFT is formed, and an area STA on which the storage common line STL is formed. The protective insulation layer 140 and the gate insulation layer 102 are patterned in the first area, and then the patterned protective insulation layer 140 and gate insulation layer 102 may remain therein.

On the other hand, the gate insulation layer 102 and the protective insulation layer 140 are removed from the second area, exposing a portion 150 of the first base substrate 101.

Referring to FIG. 1 and FIG. 3G, a color filter pattern CF is formed on the exposed portion 150 of the first base substrate 101. The color filter pattern CF may be formed by an ink-jetting method using a partition wall such as the patterned protective insulation layer 140, the gate insulation layer 102, and the second remaining pattern PR33.

The color filter pattern CF covers the portion 150 of the first base substrate 101 exposed by the first and second etching processes, so that the generation of defects such as light leakages, rubbing errors, etc. by empty space between the pixel electrode PE and the first base substrate 101 may be prevented. Moreover, a color filter pattern CF is formed in the display substrate 100, so that a color filter pattern need not be formed in the opposite substrate 200, thereby simplifying the manufacturing process.

Then, a transparent conductive layer 160 is formed on the first substrate 101 having the color filter pattern CF formed thereon. The transparent conductive layer 160 contacts an end portion of the drain electrode DE and the color filter pattern CF, and then the second remaining pattern PR33 is removed by a stripping process.

Figure 3H:
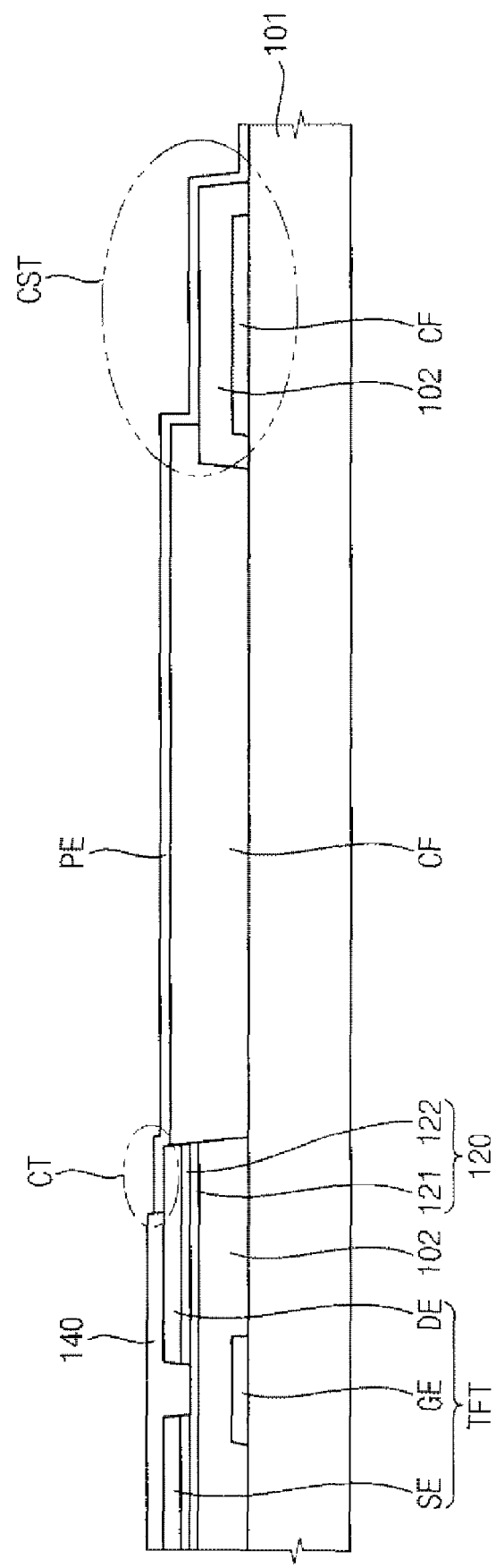

Referring to FIG. 1 and FIG. 3H, the transparent conductive layer 160 is patterned into the pixel electrode PE through the stripping process. The pixel electrode PE contacts an end portion of the drain electrode DE to form a contact portion CT, and overlaps the storage common line STL to form the storage capacitor CST. As FIG. 3H shows, the pixel electrode PE may directly contact the drain electrode DE.

Example 2

Method of Manufacturing a Display Substrate

FIGS. 4A, 4B, 4C, 4D, and 4E are cross-sectional views showing a method for manufacturing a display substrate according to another exemplary embodiment of the present invention.

Referring to FIG. 1 and FIG. 4A, a gate pattern is formed on the first base substrate 401 using a first photo-resist pattern. The gate pattern includes gate lines GLn−1 and GLn, a gate electrode GE, and a storage common line STL.

A gate insulation layer 402, a channel layer 420 and a source metal layer 430 are sequentially formed on the first base substrate 401 having the gate pattern formed thereon. The channel layer 420 includes an activation layer 421 including amorphous silicon (a-Si) and an ohmic contact layer 422 including n+amorphous silicon (n+a-Si) that is heavily doped with an n-type impurity.

A second photo-resist pattern is formed on the first base substrate 401 having the source metal layer 430 formed thereon. The second photo-resist pattern includes a first portion PR21 having a first thickness t1 and a second portion PR22 having a second thickness t2 that is relatively thinner than the first thickness t1.

The first portion PR21 is formed on a source line area (not shown) having the source lines DLm and DLm+1 formed thereon, a source electrode area SEA having the source electrode SE of the switching element TFT formed thereon, and a drain electrode area DEA having the drain electrode DE formed thereon. The second portion PR22 is formed on a channel area CHA where the source electrode SE and the drain electrode DE will be spaced apart from each other to expose the activation layer 421.

The source metal layer 430 and the channel layer 420 are patterned using the first and second portions PR21 and PR22 to form a source pattern. The source pattern includes a source metal pattern 432 and the source lines DLm and DLm+1. The source metal pattern 432 is formed in the source electrode area SEA, the channel electrode area CHA, and the drain electrode area DEA. The source lines DLm and DLm+1 are formed on the source line area (not shown).

Figure 4B:
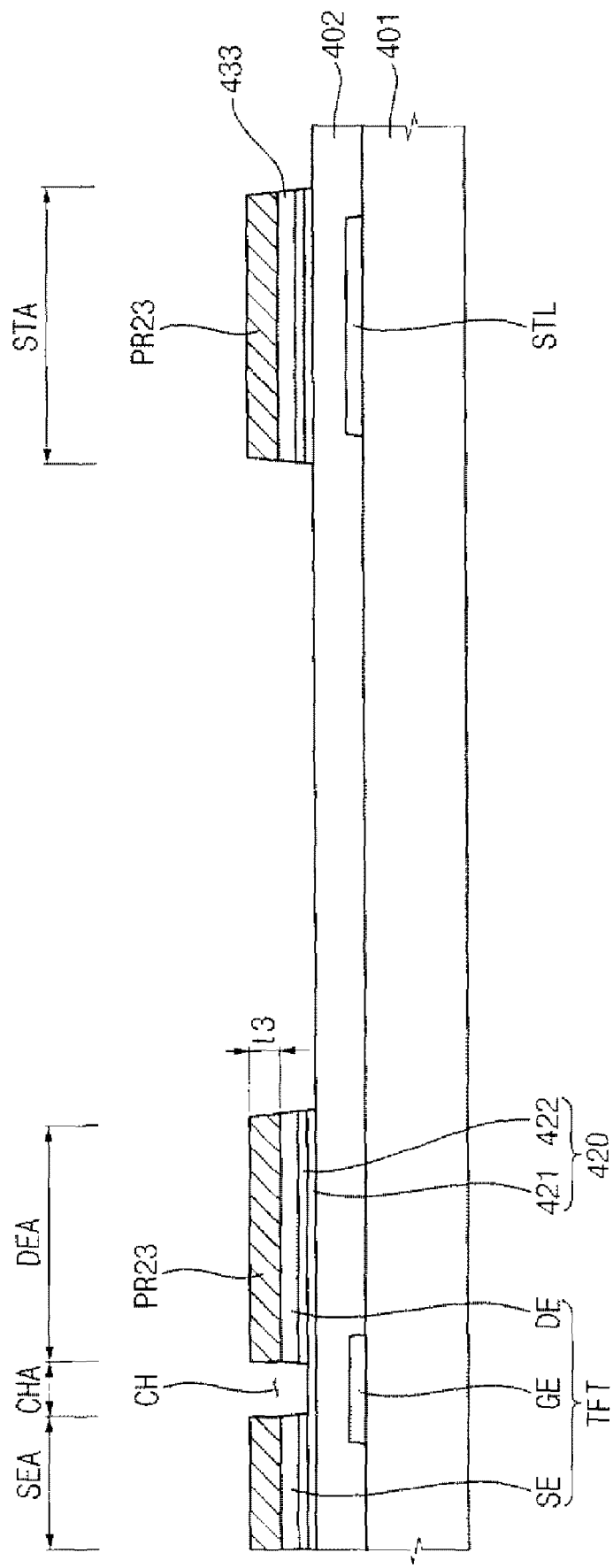

Referring to FIG. 1 and FIG. 4B, a predetermined thickness of the first portion PR21 of the second photo-resist pattern is removed by an etch-back process. Then, the second portion PR22 formed in the channel area CHA is removed by an etch-back process. A first remaining pattern PR23 of a third thickness t3 may remain on the source metal pattern 432 and the storage cover pattern 433.

The source metal pattern 432 is patterned using the first remaining pattern PR23 to form the source electrode SE and the drain electrode DE, and then the ohmic contact layer 422 of the channel area CHA is removed to expose the activation layer 421. Therefore, the source electrode SE, drain electrode DE, and channel part CH of the switching element TFT may be completed. Then, the first remaining pattern PR23 is removed.

Figure 4C:
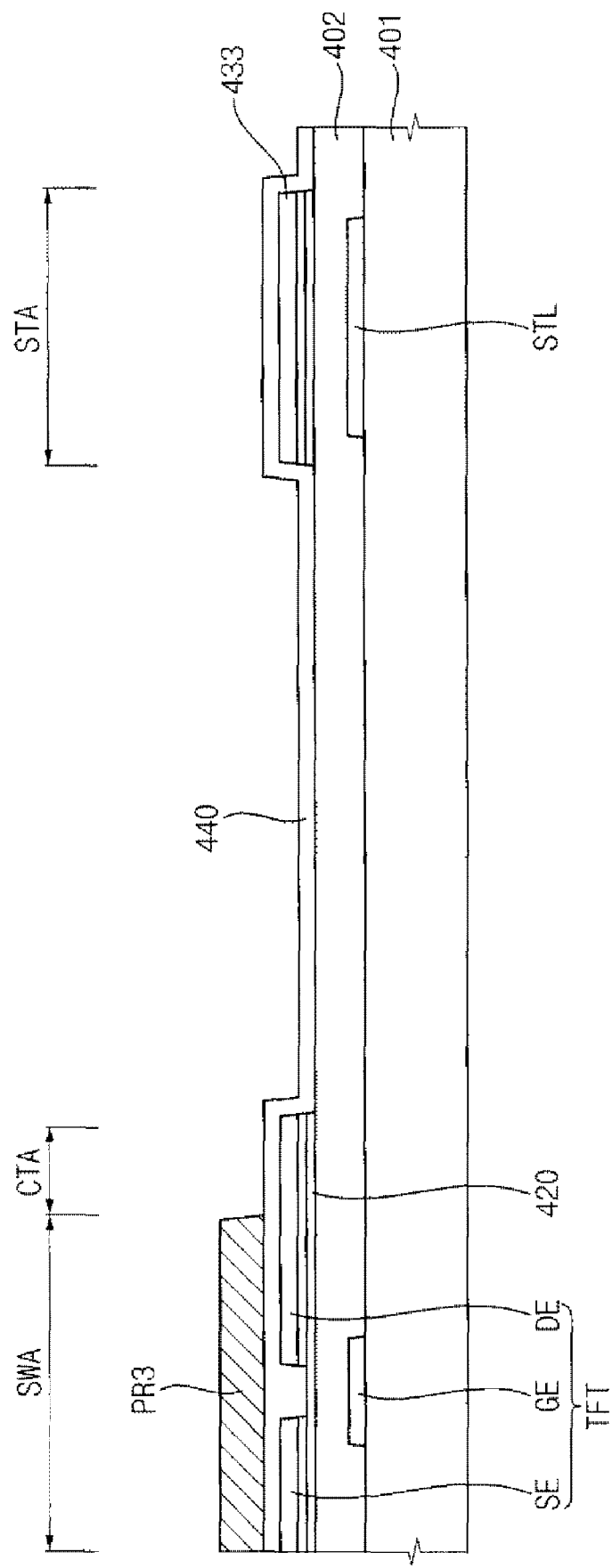

Referring to FIG. 1 and FIG. 4C, a protective insulation layer 440 is formed on the first base substrate 401 having the switching element TFT formed thereon. A third photo-resist pattern is formed on the first base substrate 401 having the protective insulation layer 440 formed thereon.

The third photo-resist pattern may be formed on an area on which the pixel electrode PE is not formed. For example, the third photo-resist pattern may be formed on an area having the gate lines GLn−1 and GLn formed thereon, an area having the source lines DLm and DLm+1 formed thereon, and an area SWA having the switching element TFT formed thereon. The third photo resist pattern is not formed on the contact area CTA where the switching element TFT will contact the pixel electrode PE.

Figure 4D:
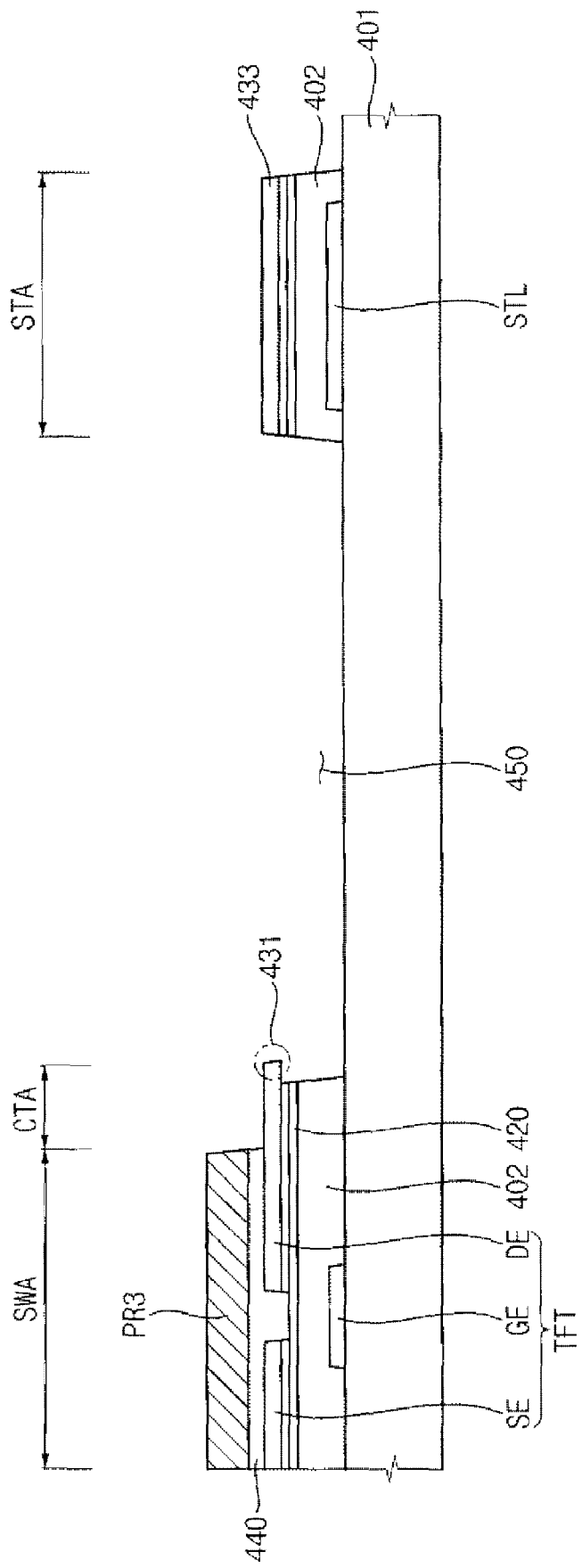

Referring to FIG. 1 and FIG. 4D, the protective insulation layer 440 and the gate insulation layer 402, which are exposed by the third photo-resist pattern PR3, are removed through a first etching process. An extrusion part 431, i.e., a tip, is formed on an end portion of the drain electrode DE by the first etching process. The extrusion part 431 and the storage cover pattern 433 are removed through a second etching process. The storage cover pattern 433 includes the source metal layer and the channel layer.

The protective insulation layer 440 and the gate insulation layer 402 are patterned and remain in an area on which the gate lines GLn−1 and GLn are formed, an area on which the source lines DLm and DLm+1 are formed, and an area SWA on which the switching element TFT is formed through the first and second etching processes. The gate insulation layer 402 that is patterned also may remain in an area STA on which the storage common line STL is formed.

The protective insulation layer 440 and the gate insulation layer 402 are etched, so that a portion 450 of the first base substrate 401 may be exposed.

Referring to FIG. 1 and FIG. 4E, a color filter pattern CF is formed on the exposed portion 450. The color filter pattern CF may be formed on the exposed portion 450 by an ink-jetting method, and thus, the generation of defects such as light leakages, rubbing errors, etc. that are often caused by empty space between the pixel electrode and the first base substrate 401 may be prevented. Moreover, a color filter pattern CF is formed in the display substrate 100, so that a color filter pattern need not be formed in the opposite substrate 200, thereby simplifying the manufacturing process.

Then, a transparent conductive layer 460 is formed on the first substrate 401 on which the color filter pattern CF is formed. The transparent conductive layer 460 contacts an end portion of the drain electrode DE and the color filter pattern CF. Then, the third photo-resist pattern PR3 is removed by a stripping process. The transparent conductive layer 460 is patterned into the pixel electrode PE through the stripping process.

As described above, the display substrate is manufactured by using a three-masking process such that the cost of manufacturing the display substrate may be reduced.

The color filter pattern is formed on the exposed portion between an area on which a metal layer such as lines, a switching element, etc., is formed by the three-masking process and in an area on which a pixel electrode is formed, and thus, the generation defects such as light leakages, rubbing errors, etc. often caused by empty space between the pixel electrode and the base substrate may be prevented.

Because the color filter pattern is formed on the display substrate using a three-masking process, the cost of manufacturing the display substrate may be reduced. Furthermore, when the display device is manufactured through the three-masking process, disadvantages associated with the three-masking process may be overcome. Additionally, the display device manufactured by the present invention may advantageously have a color filter array (COA) structure.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a display substrate, comprising:
   forming a gate pattern on a base substrate using a first photo-resist pattern;
   sequentially forming a gate insulation layer, a channel layer, and a source metal layer on the base substrate having the gate pattern formed thereon;
   patterning the source metal layer using a second photo-resist pattern to form a source pattern;
   forming a protective insulation layer on the base substrate having the source pattern formed thereon;
   patterning the protective insulation layer and the gate insulation layer using a third photo-resist pattern to expose a portion of the base substrate;
   forming a color filter pattern on the exposed portion; and
   forming a pixel electrode on the base substrate having the color filter formed thereon,
   wherein patterning the protective insulation layer and the gate insulation layer using a third photo-resist pattern to expose a portion of the base substrate comprises:
      forming the third photo-resist pattern comprising a third portion having a first thickness and a fourth portion having a second thickness that is thinner than the first thickness, the third portion being formed on a switching element area, a gate line area, and a source line area, and the fourth portion being formed on a storage area;
      etching a portion of the protective insulation layer and the gate insulation layer, the etched portion not being covered by the third photo-resist pattern to expose a portion of the base substrate and an end portion of a drain electrode;
      removing a thickness of the third photo-resist pattern to expose the protective insulation layer corresponding to the storage area; and
      removing the exposed protective insulation layer corresponding to the storage area.

2. The method of claim 1, wherein the color filter pattern is formed on the exposed portion through an ink-jetting method.

3. The method of claim 1, wherein forming a gate pattern on a base substrate using a first photo-resist pattern comprises:
   forming a gate metal layer on the base substrate; and
   patterning the gate metal layer using the first photo-resist pattern to form the gate pattern comprising a gate line, a gate electrode, and a storage common line.

4. The method of claim 3, wherein patterning the source metal layer using a second photo-resist pattern to form a source pattern comprises:
   forming the second photo-resist pattern comprising a first portion having a third thickness and a second portion having a fourth thickness that is thinner than the third thickness, the first portion being formed on a source electrode area, a drain electrode area, and the source line area, and the second portion being formed on a channel area of the switching element;

etching the source metal layer and the channel layer using the second photo-resist pattern to form a source line;

removing a thickness of the second photo-resist pattern to expose a source metal layer corresponding to the channel area; and removing the exposed source metal layer to form a source electrode, the drain electrode, and a channel part.

5. The method of claim 3, wherein patterning the source metal layer using a second photo-resist pattern to form a source pattern comprises:

forming the second photo-resist pattern comprising a first portion having a third thickness and a second portion having a fourth thickness that is thinner than the third thickness, the first portion being formed on a source electrode area, a drain electrode area, the source line area, and the storage area, and the second portion being formed on a channel area of the switching element;

etching the source metal layer and the channel layer using the second photo-resist pattern to form a source line and a storage cover pattern;

removing a thickness of the second photo-resist pattern to expose a source metal layer corresponding to the channel area; and removing the exposed source metal layer to form a source electrode, the drain electrode, and a channel part.

6. The method of claim 5, wherein exposing the portion of the base substrate comprises removing the storage cover pattern corresponding to the storage area.

7. The method of claim 6, wherein forming the pixel electrode comprises:

forming a transparent electrode layer on the base substrate comprising the third photo-resist pattern, the color filter pattern, and the drain electrode, an end portion of the drain electrode being exposed; and removing the third photo-resist pattern to form the pixel electrode, wherein the pixel electrode contacts the end portion of the drain electrode.

8. The method of claim 1, wherein forming the pixel electrode comprises:

forming a transparent electrode layer on the base substrate comprising a remaining third portion of the third photo-resist pattern, the color filter pattern, and the drain electrode, an end portion of the drain electrode being exposed; and removing the remaining third portion of the third photo-resist pattern to form the pixel electrode, wherein the pixel electrode contacts the end portion of the drain electrode.

* * * * *